(12) United States Patent
Madduri et al.

(10) Patent No.: US 9,710,277 B2
(45) Date of Patent: Jul. 18, 2017

(54) PROCESSOR POWER MANAGEMENT BASED ON CLASS AND CONTENT OF INSTRUCTIONS

(75) Inventors: Venkateswara R. Madduri, Austin, TX (US); Jonathan Y. Tong, Austin, TX (US); Hoichi Cheong, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 726 days.

(21) Appl. No.: 12/890,574

(22) Filed: Sep. 24, 2010

(65) Prior Publication Data
US 2012/0079242 A1    Mar. 29, 2012

(51) Int. Cl.
*G06F 9/30* (2006.01)
*G06F 9/38* (2006.01)
*G06F 1/32* (2006.01)

(52) U.S. Cl.
CPC .......... *G06F 9/3822* (2013.01); *G06F 1/3237* (2013.01); *G06F 1/3287* (2013.01); *G06F 9/3017* (2013.01); *G06F 9/382* (2013.01); *G06F 9/3869* (2013.01); *G06F 9/3889* (2013.01); *Y02B 60/1221* (2013.01)

(58) Field of Classification Search
CPC .................. G06F 9/382; G06F 9/3822; G06F 1/32–1/3296
See application file for complete search history.

(56) References Cited

U.S. PATENT DOCUMENTS

| | | | | |
|---|---|---|---|---|
| 5,241,637 A | * | 8/1993 | Skruhak et al. | 712/212 |
| 5,392,437 A | * | 2/1995 | Matter et al. | 713/324 |
| 5,495,617 A | * | 2/1996 | Yamada | 713/323 |
| 5,623,615 A | * | 4/1997 | Salem et al. | 712/238 |
| 5,666,537 A | * | 9/1997 | Debnath | G06F 1/3203 712/32 |

(Continued)

FOREIGN PATENT DOCUMENTS

| | | |
|---|---|---|
| JP | S5374855 A | 7/1978 |
| JP | H03167615 A | 7/1991 |

(Continued)

OTHER PUBLICATIONS

International Preliminary Report on Patentability for Application No. PCT/US2011/053147 mailed on Apr. 4, 2013, 7 pages.

(Continued)

*Primary Examiner* — Keith Vicary
(74) *Attorney, Agent, or Firm* — NDWE LLP (57) ABSTRACT

A processor and method are disclosed. In one embodiment the processor includes a prefetch buffer that stores macro instructions. The processor also includes a clock circuit that can provide a clock signal for at least some of the functional units within the processor. The processor additionally includes macro instruction decode logic that can determine a class of each macro instruction. The processor also includes a clock management unit that can cause the clock signal to remain in a steady state entering at least one of the units in the processor that do not operate on a current macro instruction being decoded. Finally, the processor also includes at least one instruction decoder unit that can decode the first macro instruction into one or more opcodes.

15 Claims, 5 Drawing Sheets

(56) References Cited

U.S. PATENT DOCUMENTS

| | | | |
|---|---|---|---|
| 5,726,921 A * | 3/1998 | Krick | 713/321 |
| 5,872,947 A * | 2/1999 | Narayan | 712/213 |
| 5,941,980 A * | 8/1999 | Shang et al. | 712/204 |
| 6,202,163 B1 * | 3/2001 | Gabzdyl et al. | 713/324 |
| 6,275,948 B1 | 8/2001 | Bays et al. | |
| 6,931,516 B2 * | 8/2005 | Douglas et al. | 712/219 |
| 2002/0091914 A1 * | 7/2002 | Merchant | G06F 9/383 712/219 |
| 2002/0144087 A1 | 10/2002 | Chen et al. | |
| 2004/0199747 A1 * | 10/2004 | Shelor | |
| 2004/0255103 A1 | 12/2004 | Duncan et al. | |
| 2004/0268090 A1 * | 12/2004 | Coke et al. | 712/209 |
| 2004/0268164 A1 * | 12/2004 | Flachs et al. | 713/320 |
| 2005/0022041 A1 * | 1/2005 | Mycroft et al. | 713/320 |
| 2005/0138335 A1 * | 6/2005 | Samra | G06F 1/3203 712/218 |
| 2006/0107076 A1 * | 5/2006 | Duncan | 713/300 |
| 2007/0250686 A1 * | 10/2007 | Bhullar et al. | |

FOREIGN PATENT DOCUMENTS

| | | | |
|---|---|---|---|
| JP | H06202754 A | | 7/1994 |
| JP | H1124928 | | 1/1999 |
| JP | 2003058365 A | * | 2/2003 |
| JP | 2004062280 A | | 2/2004 |
| JP | 2008503827 A | | 2/2008 |
| TW | I286705 B | | 9/2007 |
| TW | I319529 B | | 1/2010 |

OTHER PUBLICATIONS

International Search Report and Written Opinion for Application No. PCT/US2011/053147 mailed Mar. 27, 2012, 10 pages.
Office Action and Search Report from foreign counterpart Taiwan Patent Application No. 100134356, mailed Jan. 5, 2016, 9 pages.
Office Action from foreign counterpart China Patent Application No. 201180045688.X, mailed Dec. 26, 2014, 16 pages.
Office Action from foreign counterpart Japan Patent Application No. 2013-530380, mailed Aug. 26, 2014, 8 pages.
Office Action from foreign counterpart Japan Patent Application No. 2013-530380, mailed May 7, 2014, 27 pages.
Office Action from foreign counterpart Korean Patent Application No. 10-2013-7006957, mailed Apr. 28, 2014, 5 pages.
Notice of Allowance from foreign counterpart Taiwan Patent Application No. 100134356, mailed Oct. 14, 2016, 3 pages.

* cited by examiner

PROCESSOR POWER MANAGEMENT BASED ON CLASS AND CONTENT OF INSTRUCTIONS

FIELD OF THE INVENTION

The invention relates to managing the power consumption of a processor by clock gating individual portions of the processor that are not utilized for a given instruction class or for specific content within an instruction.

BACKGROUND OF THE INVENTION

There are many different functional units in a central processing unit (CPU) that operate in certain stages of an instruction pipeline. Depending on the class of instruction or the content within an instruction, it is often the case that not all of these functional units are utilized at the same time. Thus, there is no inherent reason all functional units within a CPU should be simultaneously on. Rather, some units at any given time may have no data to operate upon. When a functional unit has no data to operate, it is effectively idle. However, such idle units that are still fed an active clock will experience power consumption through the constant switching (i.e. toggling) of the latches throughout the unit due to the received clock signal.

x86 Instructions comprise several fields. Three of the most basic fields are the instruction opcode field (e.g., move, shift, etc.), an immediate operand field, and a displacement bytes field. Although many functional units within the instruction pipeline have circuitry to deal with these fields, some instructions that move through the pipeline do not contain any displacement byte information or an immediate operand information. In these cases, the data filling up these fields are not utilized and generally consist of random data bits. As the instruction travels through the pipeline, although these fields are not utilized, the functional units still see switching at their latches that enter this information. This switching further increases power consumption within the functional units of a CPU.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a processor and method to manage processor power based on the class and content of instructions in an instruction pipeline are disclosed.

Figure 1:
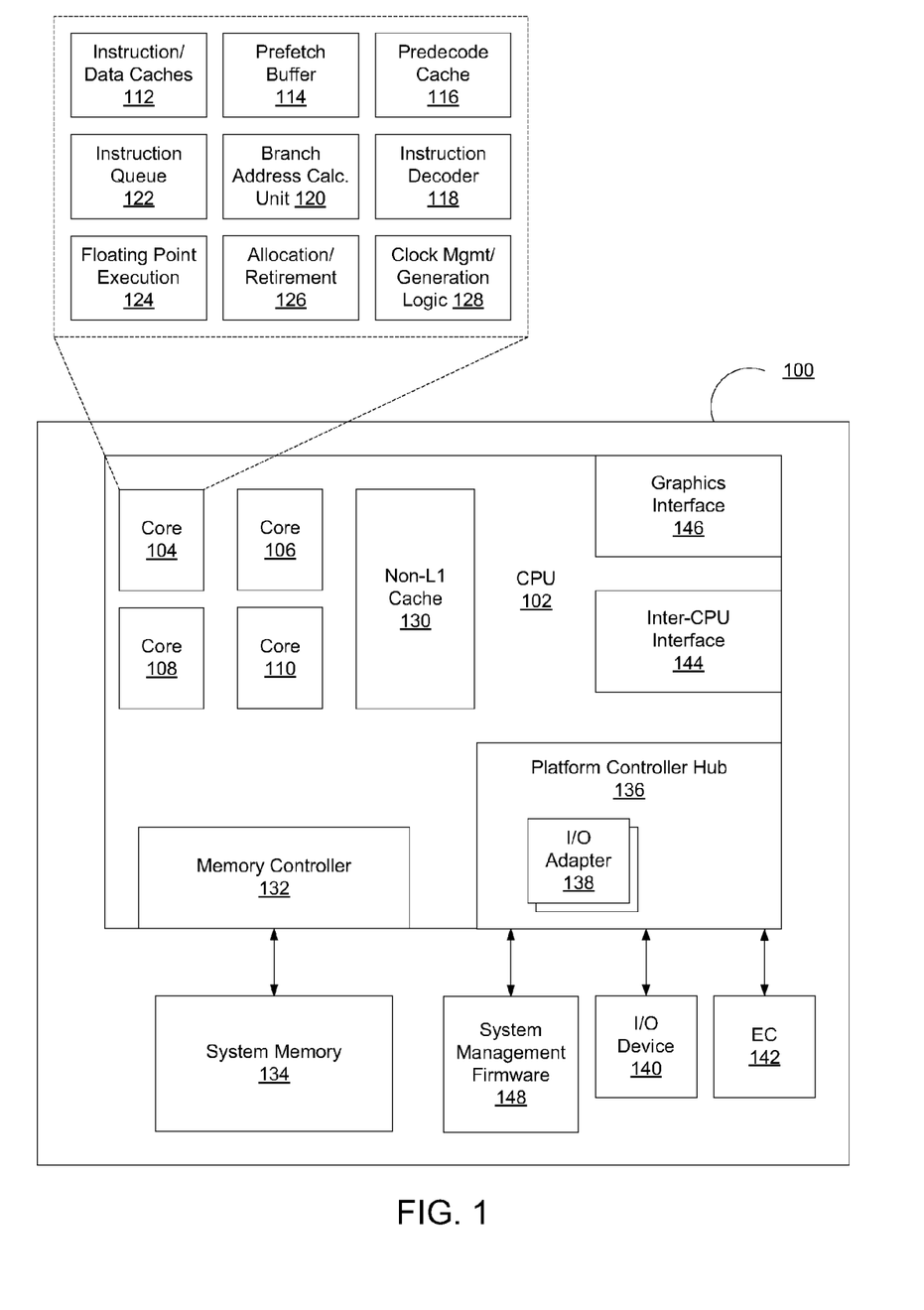
FIG. 1 illustrates an embodiment of a computer system capable of managing processor power consumption based on the class and content of instructions being executed within at least one processor in the system.

FIG. 1 illustrates an embodiment of a computer system capable of managing processor power consumption based on the class and content of instructions being executed within at least one processor in the system.

Computer system 100 is shown. The computer system may be a desktop, server, workstation, laptop, handheld, television set-top, media center, game console, integrated system (such as in a car), or other type of computer system. In several embodiments the computer system 100 includes one or more central processing units (CPUs), also referred to as "processors." Although in many embodiments there are potentially many CPUs, in the embodiment shown in FIG. 1 only CPU 102 is shown for simplicity. CPU 102 may be an Intel® Corporation CPU or a CPU of another brand. CPU 102 includes one or more cores in different embodiments. CPU 102 is shown including four cores (cores 104, 106, 108, and 110).

In many embodiments, each core includes several internal functional blocks/units/logic components such as those shown in the blown up view of core 104. For example, core 104 includes at least instruction/data (i.e., Level 1, L1) caches 112, a prefetch buffer 114, a predecode cache 116, an instruction decoder 118, a branch address calculation unit 120, an instruction queue 122, a floating point execution unit 124, an allocation/retirement unit 126, and clock management/generation logic 128. Several of these units and logic components will be discussed in significant detail below in regard to FIG. 2. In general, there are more units, registers, and other circuitry within each core than those units shown in core 104 including the potential for several copies of each of the units shown (e.g., one or more integer/address execution units, 3 floating point units, etc.), but additional units are not shown to maintain the clarity of the important elements of FIG. 1.

In a single-threaded core, each core may be referred to as a hardware thread. When a core is multi-threaded or hyper-threaded, then each thread operating within each core may also be referred to as a hardware thread. Thus, any single thread of execution running in the computer system 100 may be referred to as a hardware thread. For example, in FIG. 1, if each core is single-threaded, then there are four hardware threads present in the system (four cores). On the other hand, if each core is multi-threaded and has the capability of maintaining the states of two threads simultaneously, then there are eight hardware threads present in the system (four cores with two threads per core).

CPU 102 may also include one or more non-L1 caches, such as non-L1 cache 130. In many embodiments, at least one non-L1 cache, such as cache 130, is present in the CPU 102 outside of any given core. Additionally, in many embodiments, cache 130 is shared between the four cores shown. In other embodiments that are not shown, additional non-L1 caches other than cache 130 are implemented. In different embodiments cache 130 may be apportioned in different ways. Additionally, cache 130 may be one of many different sizes in different embodiments. For example, cache 130 may be an 8 megabyte (MB) cache, a 16 MB cache, etc. Additionally, in different embodiments cache 130 may be a direct mapped cache, a fully associative cache, a multi-way set-associative cache, or a cache with another type of mapping. In many embodiments, cache 130 may include one large portion shared among all cores or may be divided into several separately functional slices (e.g., one slice for each core). Cache 130 may also include one portion shared among all cores and several other portions that are separate functional slices per core.

In many embodiments, CPU 102 includes an integrated system memory controller 132 to provide an interface to communicate with system memory 134. In other embodiments that are not shown, memory controller 132 may be located in a discrete elsewhere in computer system 100.

System memory 134 may comprise dynamic random access memory (DRAM), such as a type of double data rate (DDR) DRAM, non-volatile memory such as flash memory, phase change memory (PCM), or another type of memory technology. System memory 134 may be a general purpose memory to store data and instructions to be operated upon by CPU 102. Additionally, there may be other potential devices within computer system 100 that have the capability to read and write to the system memories, such as a direct memory access (DMA)-capable I/O (input/output) device.

The link (i.e., bus, interconnect, etc.) that couples CPU 102 with system memory 134 may include one or more optical, metal, or other wires (i.e. lines) that are capable of transporting data, address, control, and clock information.

Platform controller hub (PCH) 136 (e.g., a complex of I/O controllers and other circuitry) includes an I/O interface that enables communication between the CPU 102 and external I/O devices. The complex may include one or more I/O adapters, such as I/O adapter 138. I/O adapters translate a host communication protocol utilized within the CPU 102 to a protocol compatible with a particular I/O device, such as I/O device 140. Some of the protocols that a given I/O adapter may translate include a Peripheral Component Interconnect (PCI)-Express, Universal Serial Bus (USB), Serial Advanced Technology Attachment (SATA), Small Computer System Interface (SCSI), Redundant Array of Inexpensive Disks (RAID), and 1394 "Firewire," among others. Additionally, there may be one or more wireless protocol I/O adapters. Examples of wireless protocols are Bluetooth, IEEE 802.11-based wireless protocols, and cellular protocols, among others.

Apart from I/O devices, the PCH 136 also may be coupled to one or more embedded controllers (ECs) in the system, such as EC 142. EC 142 may incorporate a number of functions. For example, a RAID storage controller device may be present within computer system 100. The RAID controller may manage an array of hard disk drives or solid state disks (SSDs). Other examples of the controller device may be a discrete out-of-band manageability engine, a keyboard controller, or another type of controller.

In other embodiments, PCH 136 is a discrete device located externally to the CPU 102. In these embodiments, an interface such as a direct memory interface (DMI) couples the CPU to the PCH. Though, these embodiments are not shown.

Inter-CPU interface 144 may provide an interface to a link coupled to one or more additional CPUs and allow inter-CPU communications to take place. E.g., Inter-CPU high-speed interface may be a Quick Path Interconnect (QPI) or other similar interface. Although additional CPUs are not shown in FIG. 1, in many embodiments CPU 102 is one of multiple CPUs present within computer system 100. In many embodiments, Inter-CPU interface 144 provides a point-to-point high-speed communication interface between CPU 102 and each of the other CPUs present in the system.

Graphics interface 146 may provide an interface to a link coupled to a discrete graphics controller (a discrete graphics controller is not shown). The interface may be a high-speed platform component interconnect (PCI)-Express interface or another high-speed interface. In other embodiments, CPU 102 includes an integrated graphics controller and graphics interface 146 may be coupled to a display device, such as a monitor. In many embodiments, the interface is high-speed to allow for significant graphical data traffic to be transferred across the link (e.g., 3D graphics, video, etc.).

The computer system 100 also includes a system management firmware 148 to provide boot instructions to initialize the computer system and components. In different embodiments, system management firmware may be a basic input/output system (BIOS), an extendible firmware, or another form of firmware instructions the computer system may utilize during the boot of the platform.

In many embodiments, each core within computer system 100 includes internal logic to manage core power consumption based on the class and content of instructions being executed within each core. A variety of logic within several units are utilized to clock gate certain units on a clock by clock basis through the clock management/generation logic 128.

Figure 2:
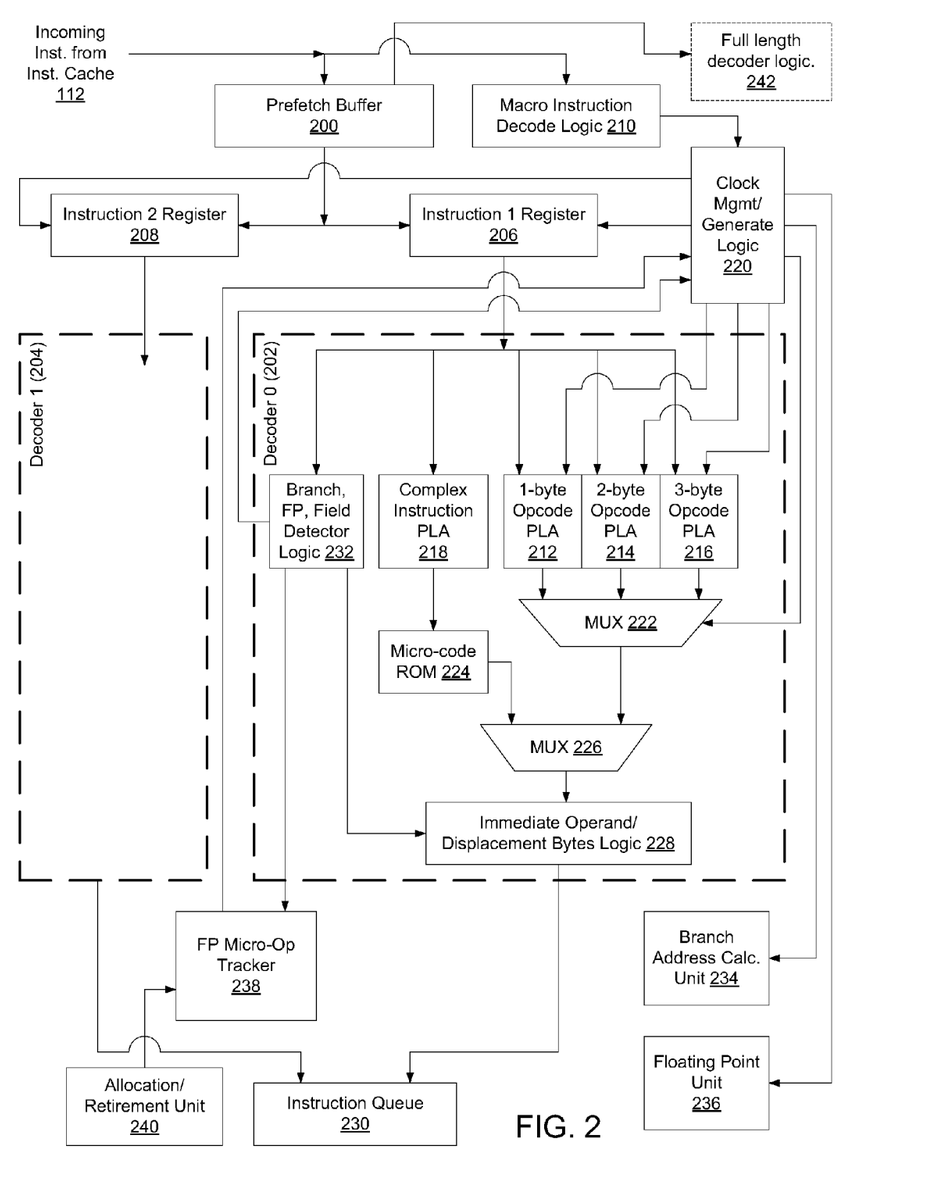
FIG. 2 illustrates specific relevant units and functional logic blocks within a given core that allows the core the capability to manage core power consumption through instruction class determination and instruction content determination.

FIG. 2 illustrates specific relevant units and functional logic blocks within a given core that allows the core the capability to manage core power consumption through instruction class determination and instruction content determination.

In a given core, macro instructions are retrieved from the instruction cache 112 and arrive into a prefetch buffer 200. In many embodiments there are two instruction decoders (decoder 0 (202) and decoder 1 (204)). The prefetch buffer 200 feeds an instruction register for each decoder (instruction 1 register (206) and instruction 2 register (208)). In the embodiments shown in FIG. 1, there are two decoders illustrated in the instruction decoder unit because the core is capable of decoding two instructions simultaneously. For sake of simplicity, the detailed circuitry within a single decoder is shown only within decoder 0. This same circuitry is present in decoder 1, it is not illustrated because the circuitry mirrors the circuitry shown in decoder 0 and, therefore, explanation of the circuitry twice is redundant.

Apart from the prefetch buffer 200, there is also predecode-based logic 210 that reads cache lines from the prefetch buffer and separates the macro instruction from instruction cache line and determines the length of the instruction based on the predecode bits. For each of the macro instructions the decode logic provides a first pass approximation of the byte-size class of instruction (i.e., whether the macro instruction will be decoded into a 1-byte micro operation (opcode), a 2-byte opcode, a 3-byte opcode, or decodes into a more complex set of one or more opcodes of varying lengthy). The byte-size class of the predecode process is an approximation because there are a few instructions where the byte-size may become incorrect. Apart from the logic shown in FIG. 2, there is another parallel decoder (full length decoder 242) that performs a full-length decode, which is fully accurate. The full length decoder though is not as efficient as the predecode length approximation and therefore it is done in parallel to the decode process performed by the logic shown in FIG. 2.

In many embodiments, if the full length decoder comes back with an opcode byte-length that is different from the macro instruction decode logic approximated length, the subsequent instructions past the current instruction are invalidated because an erroneous opcode byte-length may cause random garbage data to be utilized further down the instruction pipeline. Invalidated instructions are sent through the pipeline again with the correct opcode byte-length determined by the full length decoder. Although the invalidation of an occasional opcode and a subsequent second pass through the instruction pipeline lowers pipeline performance efficiency, the high success rate of the macro instruction decode logic byte-length approximation provides an even greater efficiency benefit to warrant this parallel dual length decode process to be utilized.

Returning now to the instruction 1 register 206, the macro instruction that is latched in this register enters decoder 0 (202) and is propagated to several logic components within the decoder. Instead of having one large programming logic array (PLA) to handle the decoding process of any type of received macro instruction, the PLAs present in decoder 0 are divided into PLAs that perform macro instruction decode per byte-length. All macro instructions that produce 1-byte opcodes are decoded in 1-byte opcode PLA 212, all macro instructions that produce 2-byte opcodes are decoded in 2-byte opcode PLA 214, and all macro instructions that produce 3-byte opcodes are decoded in 3-byte opcode PLA 216. Additionally, a complex instruction PLA 218 decodes all other opcodes that are not covered for decoding in PLAs 212-216. Generally, most macro instructions fall into the 1-3 byte opcode translations, thus the complex instruction PLA 218 may not be utilized as often as the other three PLAs.

In previous generation decoders, a PLA capable of decoding all instructions was generally present. The circuitry within all four PLAs in FIG. 2 would have been incorporated into this single PLA. Thus, no matter what byte-size class macro instruction was received by the PLA, the entire PLA was active to decode the macro instruction into corresponding opcode(s). In the present embodiment shown in FIG. 2, this circuitry is divided up into the four separate PLAs. Additionally, all PLAs are actively executing from cycle to cycle based on a received oscillating clock signal. This oscillating clock signal is received from clock management and generation logic (CMGL) 220. The CMGL 220 includes a clock circuit to generate at least one oscillating clock signal at least one frequency. Though multiple signals at multiple frequencies may be utilized to lend flexibility to the design of the processor. In some embodiments where more than one clock speed is utilized, some units take the clock signal at a double frequency, a half frequency, or any other potentially manipulated clock signal frequency altogether. Though, in some embodiments, the functional units and logic shown in FIG. 2 all run at the same frequency. In any event, the CMGL 220 may propagate an oscillating clock signal to any functional block/unit shown in FIG. 2 that requires one to run correctly. Though, to make FIG. 2 clear, only certain blocks/units are shown as having a clock signal being supplied through an outbound line from the CMGL 220, these particular clock source and destination pairs will be described below.

Additionally, the CMGL 220 also includes clock management circuitry to provide the capability to actively manage the supply of the clock signal(s) to any one or more of the functional blocks/units. For example, clock management circuitry may include clock gating logic to pull the clock signal up to a steady state high state or push the clock signal down to a steady low state.

When a functional block/unit, which requires a clock to run, is denied an incoming clock signal, the block/unit stops functioning because the internal circuitry is forced into a steady state rather than having switching activity in the circuitry (i.e., switching/toggling based on being supplied the clock signal). Therefore, if CMGL 220 shuts down a clock signal to a block/unit of functional logic, the logic ceases operation. This saves dynamic switching power consumption in the circuitry of the block/unit.

Thus, CMGL 220 may or may not shut down a clock signal being supplied to any given functional block/unit in FIG. 2. In many embodiments, macro instruction decode logic 210 sends the CMGL 220 the byte-size class length approximation information it has determined corresponding to a given instruction that has entered the instruction 1 register 206. In many embodiments, the approximated byte-size class length may generally be 1, 2, or 3 bytes. The CMGL 220, for the next clock cycle, maintains the supplied clock signal to the PLA corresponding to the approximated length and pulls the clock it is supplying to the other two PLAs that decode other lengths to a steady state. For the aforementioned next clock cycle, only one of the three specific byte-length PLAs will be operational. Furthermore, the other two specific byte-length PLAs will not be operational and will consume less dynamic power because there will be no dynamic switching power consumption within their respective circuitries.

At a next clock cycle where a subsequent instruction awaits in the instruction 1 register 206 to be decoded, the same process takes place. Thus, during any given clock cycle, at most only one of the 1, 2, and 3-byte opcode PLAs will be consuming significant dynamic switching power. In many embodiments, the complex instruction PLA 218 always receives a supplied clock because the CMGL 220 does not have a clock gating capability for that particular PLA.

In the case of a 1, 2, or 3 byte decode, once the macro instruction has passed through the relevant byte-length PLA and has been decoded into the corresponding opcode, it is multiplexed through MUX 222. In the case of a complex instruction that requires PLA 218, the result may produce opcode(s) from micro-code read-only memory (ROM) 224. The output of MUX 222 is then multiplexed again with the output of PLA 218 and micro-code ROM 224 through MUX 226. The opcode output of MUX 226, which comprises the resulting opcode from the decoder, then is received at logic 228 that handles any displacement bytes and/or an immediate operand that may have been fields appended to the original macro instruction in the prefetch buffer 200. Once the displacement bytes and/or immediate operand are handled (if there were any fields appended to the original macro instruction), the opcode is then sent out of decoder 0 and to the instruction queue 230 to wait for execution.

In many embodiments, the macro instruction decode logic 210 may partially decode a given received macro instruction. The macro instruction decode logic 210 will also provide a set of predecode bits that are created during the predecode process on a given macro instruction. In some embodiments, the macro instruction decode logic 210 may be able to determine that a second instruction simultaneously decoded in decoder 1 is invalid based on the predecode bits. There are many examples as to why a second instruction may be invalid (e.g., a branching issue), but regardless of the reason, once the macro instruction decode logic 210 realizes a second instruction entering decoder 1 will be invalid, macro instruction decode logic 210 may cause CMGL 220 to gate the clock signal supplied to the entire decoder 1. For example, CMGL 220 may pull up the clock to a steady state to the instruction 2 register 208 to not allow the latches in the register to release the instruction into decoder 1. In other embodiments, CMGL 220 may individually supply all major functional units/blocks within decoder 1 based on a clock tree that enters the decoder at a single location (not shown in FIG. 2). In these embodiments, CMGL 220 can clock gate the entire tree entering the decoder. Thus, if the predecoder logic 210 determines an instruction is invalid, it can essentially shut down all logic within the decoder scheduled to decode the instruction into an opcode by gating the clocks supplied to the decoder logic.

Returning to decoder 0, a branch, floating point, field detector logic (BFFDL) 232 also receives the macro instruction propagated into decoder 0 from instruction 1 register 206. The BFFDL 232 includes several portions of detection logic to assist in power management within the core.

As the name of the logic suggests, there is separate branch detection logic, floating point detection logic, and field detection logic within the BFFDL 232. The branch detection logic determines whether the instruction will require a branch address calculation.

A branch address calculation unit 234 will calculate what a branch address will be for a branch instruction. If the macro instruction does not involve any form of a branch, this branch address calculation unit 234 will not be utilized, yet the clock supplied to this unit would normally still be operational, which again causes unneeded dynamic switching power consumption. To minimize branch address calculation unit 234 power consumption, the BFFDL 232 will recognize that a next instruction that would reach the branch address calculation unit 234 is not a branch instruction. The BFFDL 232 may send this information to the CMGL 220 to cause the CMGL 220 to gate a clock supplied to the branch address calculation unit 234.

Field detection logic within the BFFDL 232 has the capability of determining whether the specific macro instruction received actually has data in a displacement bytes field and/or data in an immediate operand field. Many macro instructions do not utilize these fields. Although even if the fields are not utilized, logic throughout the pipeline that handle opcodes have slots for these fields, those slots will have random garbage data within them that is passed along with the opcode. Random garbage data causes dynamic switching power consumption even though the data is not utilized. Thus, in many embodiments, the BFFDL 232, once it has determined that the macro instruction does not utilize one or both of these fields, instructs logic 228 to zero out the unused fields. This zeroing out of the field(s) further minimizes pipeline power consumption among functional units/blocks within the core.

Floating point detection logic within the BFFDL 232 detects whether the incoming macro instruction is a floating point (FP) operation. In many embodiments, a floating point unit 236 that handles floating point calculations may be clock gated similarly to the other units clock gated above, but the clock gating of the floating point unit is more complex because there is lead time required for the unit to function properly and it is impractical to clock gate the entire FP unit 236 per clock. Thus, in many embodiments, the FP unit 236 is only clock gated when there are no FP operations present in the entire pipeline. The pipeline that concerns the FP unit generally comprises starting at the decoder unit (to decode the FP macro instruction) and ending at the retirement unit (retiring the FP instruction after execution has been completed). Thus, a state machine may be implemented to support tracking a full set of FP operations present in the pipeline (between decode and retirement).

An FP micro-op tracker unit 238 may keep track of any FP instructions/opcodes present in the pipeline and instruct the CMGL 220 to clock gate the FP unit 236 if no FP instructions/opcodes are present. The BFFDL 232 sends information to the FP micro-op tracker 238 when an FP instruction is entering the decode stage. The FP instruction then passes through the entire pipeline and eventually retires. During retirement, the allocation/retirement unit 240 informs the FP micro-op tracker 238 that the FP instruction has retired. Once retired, if no additional FP instructions have entered the decoder, the FP micro-op tracker 238 may instruct the CMGL 220 to shut down the clock(s) entering the FP unit 236.

Figure 3:
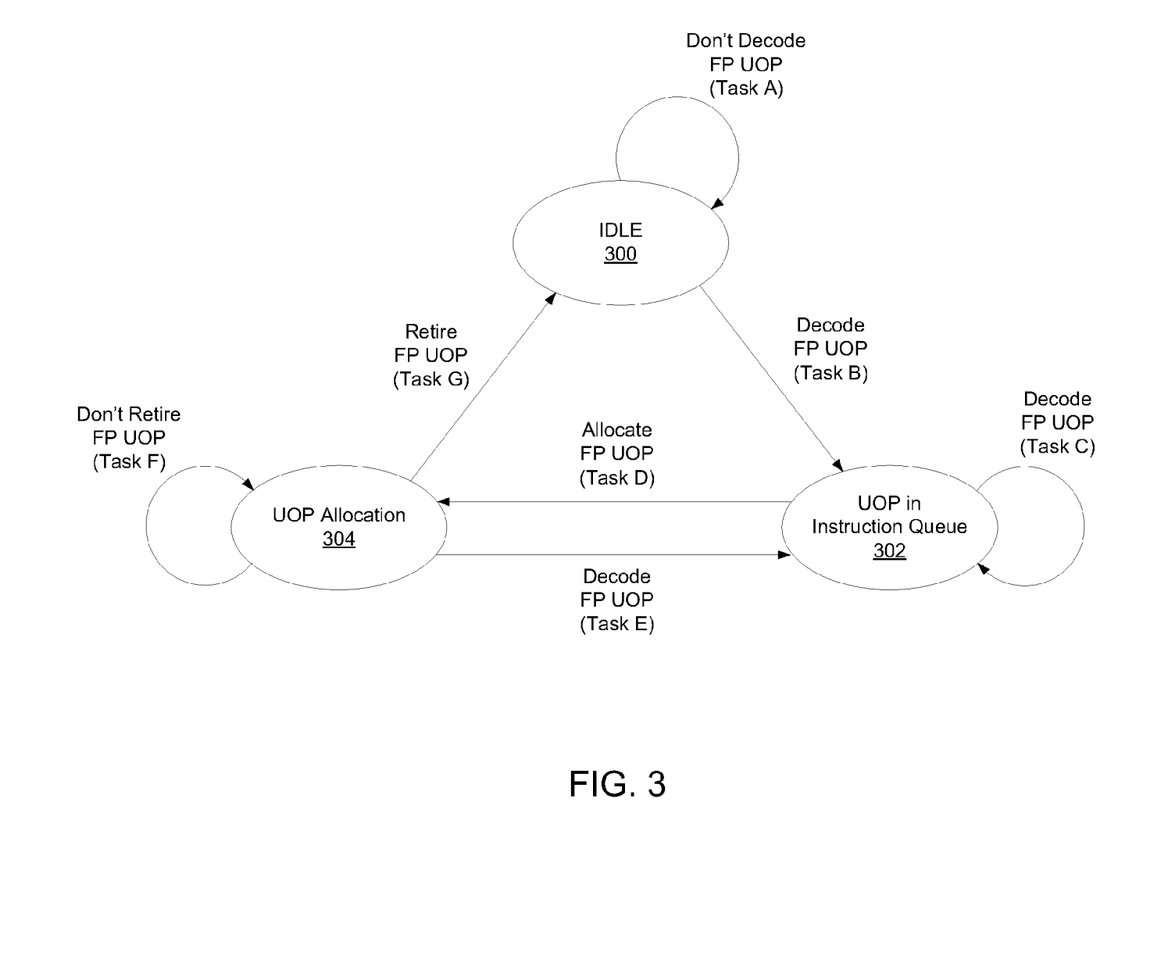
FIG. 3 describes an embodiment of a state machine utilized to track floating point micro operations through an instruction pipeline.

FIG. 3 describes an embodiment of a state machine utilized to track floating point micro operations through an instruction pipeline.

The beginning state shows the pipeline in an idle state regarding floating point micro operations (state 300). If no FP micro operation (uOP) is received, the state machine remains at the idle state because the pipeline doesn't decode an FP uOP (task A). If an FP uOP arrives, the pipeline decodes the FP uOP (task B) and the state machine transitions to a next state where the uOP has finished the decode stage and is now in the instruction queue (state 302). Once a FP uOP is in the instruction queue, the only way to get back to the idle state is for the FP uOP to retire without any additional FP uOPs remaining in the pipeline.

Once the FP uOP is in the instruction queue (state 302), two events may happen. First, if the FP uOP in the instruction queue is still in the instruction queue while a new, second FP uOP arrives into the decoder, the state machine stops tracking the first FP uOP, and instead transitions to tracking the second FP uOP that has just arrived. This is because the second FP uOP will retire after the first FP uOP. The pipeline performs the task of decoding another FP uOP (task C).

The other potential event is that the uOP in the instruction queue may be allocated resources to be executed (task D). In this case, the state machine transitions to the uOP allocation state (state 304).

Once in the uOP allocation state, an additional three events may happen. First, if the first FP uOP in the allocation stage (state 304) has yet to be retired and a new, second FP uOP arrives into the decoder, the state machine stops tracking the first FP uOP, and instead transitions to tracking the second FP uOP that has just arrived. This is because the second FP uOP will retire after the first FP uOP. The pipeline performs the task of decoding another FP uOP (task E). This causes the state machine to return to the UOP being in the instruction queue state (state 302) and the state machine is now tracking the second FP uOP.

A second event that may happen in state 304 is the FP uOP allocation has taken place, but FP uOP retirement has not happened. In this case a non-event takes place because the pipeline does not retire the FP uOP (task F). This may take place during execution of the FP uOP.

The third event that may happen in state 304 is the pipeline may retire the FP uOP (task G). When this event takes place, the state machine moves back to idle (state 300). At any given point when the state machine is in the idle state, the FP micro-op tracker (238 in FIG. 2) may instruct the CMGL 220 to clock gate the FP unit 236.

Figure 4:
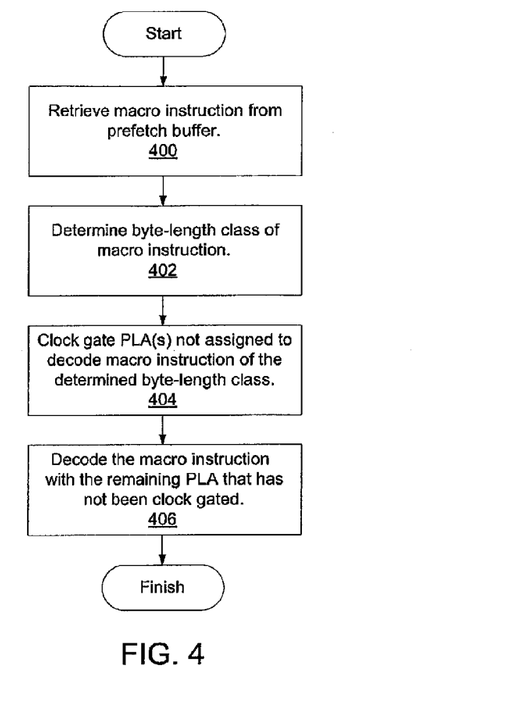
FIG. 4 is a flow diagram of an embodiment of a process to clock gate one or more programmable logic arrays in a decoder that are not configured to decode a current instruction entering the decoder.

FIG. 4 is a flow diagram of an embodiment of a process to clock gate one or more programmable logic arrays in a decoder that are not configured to decode a current instruction entering the decoder.

The process is performed by processing logic that may comprise hardware circuitry and/or microcode in different embodiments. The process begins by processing logic retrieving a macro instruction from a prefetch buffer (processing block 400). The process continues by processing logic determining a byte-length class of the macro instruction (processing block 402). Based on the determination, processing logic then clock gates one or more PLAs in the decoder that the macro instruction is to be decoded within (processing block 404). The specific PLA(s) that are clock gated are those that are not assigned to decode macro instructions of the determined byte-length class. Finally, processing logic then decodes the macro instruction in the decoder with the remaining PLA that has not been clock gated (processing block 406).

Figure 5:
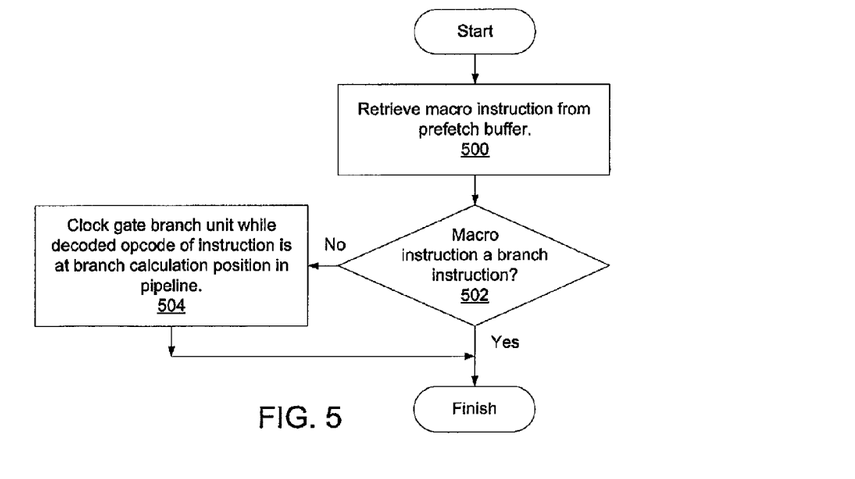
FIG. 5 is a flow diagram of an embodiment of a process to clock gate a branch unit when a branch instruction is not being decoded in the pipeline.

FIG. 5 is a flow diagram of an embodiment of a process to clock gate a branch unit when a branch instruction has not been decoded.

The process is performed by processing logic that may comprise hardware circuitry and/or microcode in different embodiments. The process begins by processing logic retrieving a macro instruction from the prefetch buffer (processing block 500). Processing logic then determines if the instruction is a branch instruction (processing block 502). If the instruction is a branch instruction the process is finished. Otherwise, if the instruction is not a branch instruction, processing logic clock gates the branch unit during the clock cycle that the opcode produced from the macro instruction is at the branch calculation position in the pipeline (processing block 504) and the process is complete.

Figure 6:
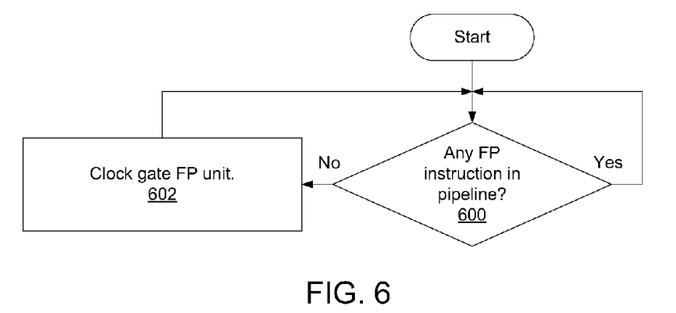
FIG. 6 is a flow diagram of an embodiment of a process to clock gate a floating point unit when no floating point instruction is present in the instruction pipeline.

FIG. 6 is a flow diagram of an embodiment of a process to clock gate a floating point unit when no floating point instruction is present in the instruction pipeline.

The process is performed by processing logic that may comprise hardware circuitry and/or microcode in different embodiments. The process begins by processing logic determining if there is any FP instruction in the pipeline between the decode unit and the retirement unit (processing block 600). If there is an FP instruction somewhere in the pipeline, the process returns to block 600 and checks again. Otherwise, if there is no FP instruction in the pipeline, processing logic clock gates the FP unit (processing block 602) and the process is finished. In many embodiments, this process utilizes a state machine detailed in FIG. 3 to track the presence of FP instructions in the pipeline.

Figure 7:
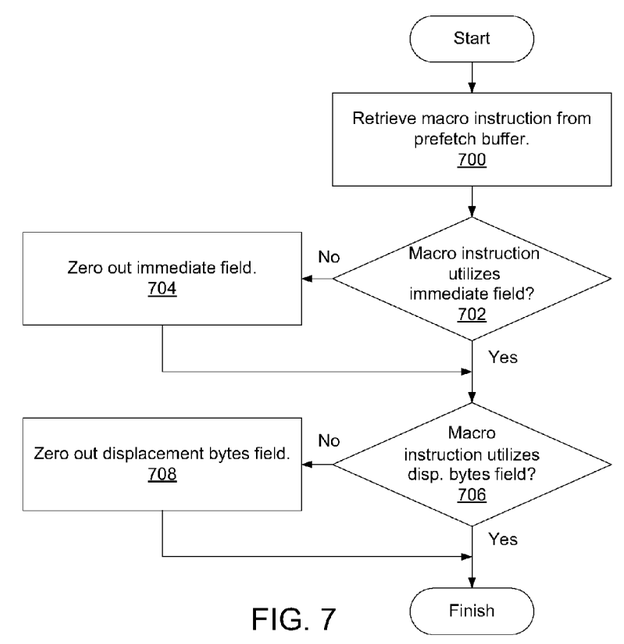
FIG. 7 is a flow diagram of an embodiment of a process to zero out the immediate and displacement byte fields of an instruction when the instruction does not utilize those fields.

FIG. 7 is a flow diagram of an embodiment of a process to zero out the immediate and displacement byte fields of an instruction when the instruction does not utilize those fields.

The process is performed by processing logic that may comprise hardware circuitry and/or microcode in different embodiments. The process begins by processing logic retrieving a macro instruction from the prefetch buffer (processing block 700). Processing logic then determines if the instruction utilizes the immediate field (processing block 702). If the instruction does not use the immediate field, processing logic zeroes out all data in the immediate field of the instruction (processing block 704). Whether or not the instruction utilizes the immediate field, processing block next determines if the instruction utilizes the displacement bytes field (processing block 706). If the instruction uses the displacement bytes field, the process is complete. Otherwise, if the instruction does not use the displacement bytes field, processing logic zeroes out all data in the displacement bytes field of the instruction (processing block 708) and the process is complete.

In many embodiments, when clock gating is performed on a given functional block/unit, the clock is gated for at least one clock cycle to the unit, though the clock gating may take place over more than one cycle depending on the particular reason for clock gating the unit. For example, clock gating the 1-byte PLA generally is done on a single clock cycle basis because instructions are brought in to be decoded at each clock cycle, thus the PLA may be gated for as little as one clock cycle. In the same regard, thousands of macro-instructions may run through the pipeline without a single floating point operation, in this case, the FP unit may be clock gated for many clock cycles consecutively.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The invention claimed is:

1. A processor, comprising:
a prefetch buffer to store a plurality of macro instructions;
a clock circuit to provide an oscillating clock signal to be used by one of a plurality of circuits in the processor;
macro instruction decode circuitry to determine a class of each macro instruction retrieved from the prefetch buffer and determine whether a macro instruction utilizes a displacement byte field and zero out the displacement byte field in the macro instruction in response to the macro instruction not utilizing the displacement byte field;
a first decoder circuit of an instruction decoder circuit of the plurality of circuits to decode a first macro instruction into one or more opcodes;
a floating point micro-operation tracker to track a floating point micro-operation, wherein the floating point micro-operation corresponds to a floating point macro instruction of the plurality of macro instructions, from a time when the corresponding floating point macro instruction is retrieved from the prefetch buffer to retirement of the floating point micro-operation and set a floating point pipeline clear flag indicating that, when set, no floating point micro-operations are currently being tracked, wherein an indication of retirement is to be provided by retirement circuitry to the floating point micro-operation tracker; and
a clock management circuit to cause an oscillating clock signal entering a floating point circuit of the plurality of circuits to remain in a steady state for at least one clock cycle in response to the floating point pipeline clear flag being set.

2. The processor of claim 1, wherein the first decoder circuit is to include:
a first programmable logic array (PLA) circuit of the plurality of circuits to decode macro instructions, retrieved from the prefetch buffer, that produce a one-byte opcode,
a second PLA circuit of the plurality of circuits to decode macro instructions, retrieved from the prefetch buffer, that produce a two-byte opcode, and
a third PLA circuit of the plurality of circuits to decode macro instructions, retrieved from the prefetch buffer, that produce a three-byte opcode; and
wherein the macro instruction decode circuitry is further to determine a byte-length of an opcode produced from the first macro instruction and the clock management circuit is further to cause an oscillating clock signal entering any of the first, second, and third PLA circuits which do not decode macro instructions of the determined byte-length to remain in a steady state for at least one clock cycle.

3. The processor of claim 1, wherein the clock management circuit is further to cause a second oscillating clock signal entering a branch address calculation circuit of the plurality of circuits to remain in a steady state for at least one clock cycle in response to a class of the first macro instruction being determined to not be a branch instruction.

4. The processor of claim 1, wherein the macro instruction decode circuitry is further to:
determine whether the first macro instruction includes an immediate operand; and
zero out an immediate operand field in the first macro instruction in response to the first macro instruction not having the immediate operand.

5. The processor of claim 1, further comprising:
a second decoder circuit;
wherein the macro instruction decode circuitry is further to determine whether a second macro instruction of the plurality of macro instructions is not valid, the first macro instruction is to enter the first decoder circuit at a first clock cycle and the second macro instruction is to enter the second decoder circuit at the first clock cycle; and
the clock management circuit is further to cause a second oscillating clock signal entering the second decoder circuit to remain in a steady state for at least one clock cycle in response to the second macro instruction being determined to be not valid.

6. A method, comprising:
storing a plurality of macro instructions in a prefetch buffer;
determining a class of each macro instruction retrieved from the prefetch buffer;
in response to the determination of the class of a first macro instruction of the plurality of macro instructions, causing a first oscillating clock signal supplied by a clock circuit to one of a plurality of circuits in a processor that is not utilized to operate on the first macro instruction, as determined by the class of the first macro instruction, to be gated;
determining, by macro instruction decode circuitry, whether the first macro instruction utilizes a displacement byte field; zeroing out, by the macro instruction decode circuitry, the displacement byte field in the first macro instruction in response to the first macro instruction not utilizing the displacement byte field;
decoding the first macro instruction into one or more opcodes;
conducting a full-length decode of the first macro instruction by a full-length decoder in parallel with the decoding the first macro instruction into one or more opcodes;
tracking a floating point micro-operation by a floating point micro-operation tracker, wherein the floating point micro-operation corresponds to a floating point macro instruction of the plurality of macro instructions, from a time when the corresponding floating point macro instruction is retrieved from the prefetch buffer to a time of retirement of the floating point micro-operation;
setting a floating point pipeline clear flag indicating that, when set, no floating point micro-operations are currently being tracked;
providing an indication of retirement by retirement circuitry to the floating point micro-operation tracker; and
causing a second oscillating clock signal entering a floating point unit of the plurality of circuits to remain in a steady state for at least one clock cycle in response to the floating point pipeline clear flag being set.

7. The method of claim 6, further comprising:
determining a byte-length produced from the first macro instruction; and
causing a third oscillating clock signal entering any of a first, second, and third PLA which do not decode macro instructions of the determined byte-length produced from the first macro instruction to remain in a steady state for at least one clock cycle.

8. The method of claim 6, further comprising:
causing a third oscillating clock signal entering a branch address calculation circuit of the plurality of circuits to remain in a steady state for at least one clock cycle in response to a class of the first macro instruction being determined to not be a branch instruction.

9. The method of claim 6, further comprising:
determining whether the first macro instruction includes an immediate operand; and
zeroing out an immediate operand field in the first macro instruction in response to the first macro instruction not having the immediate operand.

10. The method of claim 6, further comprising:
determining whether a second macro instruction of the plurality of macro instructions is not valid, the first macro instruction to enter a first decoder circuit of an instruction decoder circuit at a first clock cycle and the second macro instruction to enter a second decoder circuit of the instruction decoder circuit at the first clock cycle; and
causing a third oscillating clock signal entering the second decoder circuit to remain in a steady state for at least one clock cycle in response to the second macro instruction being determined to be not valid.

11. A processor, comprising:
a prefetch buffer to store a plurality of macro instructions;
macro instruction decode circuitry to determine a class of each macro instruction retrieved from the prefetch buffer and determine whether a first macro instruction retrieved from the prefetch buffer utilizes a displacement byte field and zero out the displacement byte field in the first macro instruction in response to the first macro instruction not utilizing the displacement byte field;
a floating point micro-operation tracker to track a floating point micro-operation, wherein the floating point micro-operation corresponds to a floating point macro instruction of the plurality of macro instructions, from a time when the corresponding floating point macro instruction is retrieved from the prefetch buffer to a time of retirement of the floating point micro-operation, and set a floating point pipeline clear flag indicating that, when set, no floating point micro-operations are currently being tracked, wherein an indication of retirement is to be provided by retirement circuitry to the floating point micro-operation tracker; and
a clock management circuit to cause a first oscillating clock signal entering a floating point unit of a plurality of circuits to remain in a steady state for at least one clock cycle in response to the floating point pipeline clear flag being set.

12. The processor of claim 11, further comprising:
a first decoder circuit to decode the first macro instruction into one or more opcodes, the first decoder circuit comprising:
a first programmable logic array (PLA) circuit of the plurality of circuits to decode macro instructions, retrieved from the prefetch buffer, that produce a one-byte opcode,
a second PLA circuit of the plurality of circuits to decode macro instructions, retrieved from the prefetch buffer, that produce a two-byte opcode, and
a third PLA circuit of the plurality of circuits to decode macro instructions, retrieved from the prefetch buffer, that produce a three-byte opcode, and
wherein the macro instruction decode circuitry is to determine a byte-length of an opcode produced from the first macro instruction; and
wherein the clock management circuit is to cause a second oscillating clock signal entering any of the first, second, and third PLA circuits which do not decode macro instructions of the determined byte-length to remain in a steady state for at least one clock cycle.

13. The processor of claim 12, further comprising:
a second decoder circuit;
wherein the macro instruction decode circuitry is further to determine whether a second macro instruction of the plurality of macro instructions is not valid, the first macro instruction to enter the first decoder circuit at a first clock cycle and the second macro instruction to enter the second decoder circuit at the first clock cycle; and
a circuit to cause a third oscillating clock signal entering the second decoder circuit to remain in a steady state for at least one clock cycle in response to the second macro instruction being determined to be not valid.

14. The processor of claim 11, wherein the clock management circuit is to cause a second oscillating clock supplied to a branch address calculation circuit of the plurality of circuits to remain in a steady state for at least one clock cycle in response to a class of the first macro instruction retrieved from the prefetch buffer being determined to not be a branch instruction.

15. The processor of claim 11, wherein the macro instruction decode circuitry is further to:
determine whether the first macro instruction retrieved from the prefetch buffer includes an immediate operand; and
zero out an immediate operand field in the first macro instruction in response to the first macro instruction not having an immediate operand.

* * * * *